Patented Mar. 29, 1932

1,851,007

UNITED STATES PATENT OFFICE

FRITZ GÜNTHER, KARL VIERLING, AND WILHELM PUNGS, OF LUDWIGSHAFEN-ON-THE-RHINE, GERMANY, ASSIGNORS, BY MESNE ASSIGNMENTS, TO WINTHROP CHEMICAL COMPANY, INC., OF NEW YORK, N. Y., A CORPORATION OF NEW YORK

DISINFECTANT AND PRESERVING AGENT

No Drawing. Application filed April 30, 1927, Serial No. 188,046, and in Germany May 20, 1926.

The present invention relates to new disinfectants and preserving agents.

In the U. S. P. 1,412,937 the process of manufacturing thymol is described, which comprises treating sulfonated meta-cresol with isopropyl alcohol and strong sulfuric acid, then splitting off the sulfonic group and subjecting the product to fractional distillation. Hereby, at first unaltered meta-cresol distills over, then thymol, and at last "after-runnings" are obtained (compare U. S. Patent No. 1,412,937, lines 55–59). The "after-runnings" consist partly of a compound crystallizing from benzene in large crystals, melting at 114–115 degrees C. and corresponding to the formula: $C_{10}H_{14}O$ the remainder being oily constituents boiling above 200 degrees C.

The products contained in the "after-runnings" had hitherto no practical use.

We have now found that the above mentioned compound melting at 114–115 degrees C. as well as the oily constituents contained in the "after-runnings" possess excellent disinfecting and preserving properties. For example, staphylococci are destroyed by an 0.12 per cent aqueous solution of the said oily constituents in 10 minutes, whereas in the case of for example the well-known disinfectant lysol an 0.5 per cent aqueous solution is required therefor.

As the said by-products of the synthesis of thymol possess a mild, pleasant taste, they can be employed for the manufacture of cosmetics such as tooth-pastes, gargles and the like and such preparations are distinguished from the known ones by the property of the said by-products of retarding the growth of bacteria, fungi and the like (the growth of for example staphylococci is strongly retarded even by a 0.005 per cent solution). Of course, such preparations may also contain other suitable additions, for example essential oils and the like, or other disinfectants.

Owing to their high disinfecting properties the said by-products are also very suitable for use as preserving agents. For example glue is excellently preserved by an addition of 0.2 per cent of isothymol, whereas an addition of 5 per cent of sodium benzoate does not prevent decomposition of the glue.

What we claim is:

1. A disinfectant and preserving agent, comprising a compound crystallizing from benzene in large crystals, melting at 114–115° C. and obtainable as a by-product in the manufacture of thymol from meta-cresol.

2. A disinfectant and preserving agent comprising such oily constituents boiling above 200° C. as are obtainable as by-products in the synthetic manufacture of thymol from meta-cresol.

3. A disinfectant and preserving agent comprising a substance selected from the class of substances obtainable as by-products in the synthetic manufacture of thymol from meta-cresol, said class of substances consisting of a compound crystallizing in large crystals from benzene and melting at 114–115° C. and oily constituents boiling above 200° C.

In testimony whereof we have hereunto set our hands.

FRITZ GÜNTHER.
KARL VIERLING.
WILHELM PUNGS.